(12) United States Patent
Cobb et al.

(10) Patent No.: US 6,717,649 B2
(45) Date of Patent: Apr. 6, 2004

(54) DETECTION OF PITCH VARIATIONS IN LENTICULAR MATERIAL

(75) Inventors: Joshua M. Cobb, Victor, NY (US); Jeffery R. Hawver, Rochester, NY (US); Andrea S. Rivers, Bloomfield, NY (US); Roger A. Morton, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/116,939

(22) Filed: Apr. 5, 2002

(65) Prior Publication Data

US 2002/0171814 A1 Nov. 21, 2002

Related U.S. Application Data

(63) Continuation-in-part of application No. 09/033,212, filed on Mar. 2, 1998, now abandoned, which is a continuation-in-part of application No. 08/828,637, filed on Mar. 31, 1997, now Pat. No. 5,835,194.

(51) Int. Cl.[7] .................. G03B 27/32; G03B 35/14; B41J 2/435

(52) U.S. Cl. .................. 355/33; 355/22; 347/248
(58) Field of Search .................. 355/22, 33; 356/124; 359/463; 430/22, 322; 396/33; 353/121; 347/248; 250/559.3

(56) References Cited

U.S. PATENT DOCUMENTS 5,681,676 A * 10/1997 Telfer et al. .............. 430/22
5,812,152 A * 9/1998 Torigoe et al. ............ 347/2

* cited by examiner

*Primary Examiner*—Peter B. Kim
(74) *Attorney, Agent, or Firm*—William F. Noval

(57) ABSTRACT

A method of sensing the pitch or relative location of a lenticular lens on a sheet of transparent lenticular material of the type having a repeating pattern of cylindrical lenses on one side and a flat opposite side, comprising the steps of: forming a beam of light; focusing the beam of light into a spot smaller than the pitch of the cylindrical lenses onto the lenticular material; moving the lenticular material relative to the beam in a direction perpendicular to the axes of the cylindrical lenses to modulate the angle of reflection or refraction of the beam of light; and sensing the position of the modulated beam of light to determine the pitch or relative location of lenticular material to the focused spot.

6 Claims, 8 Drawing Sheets

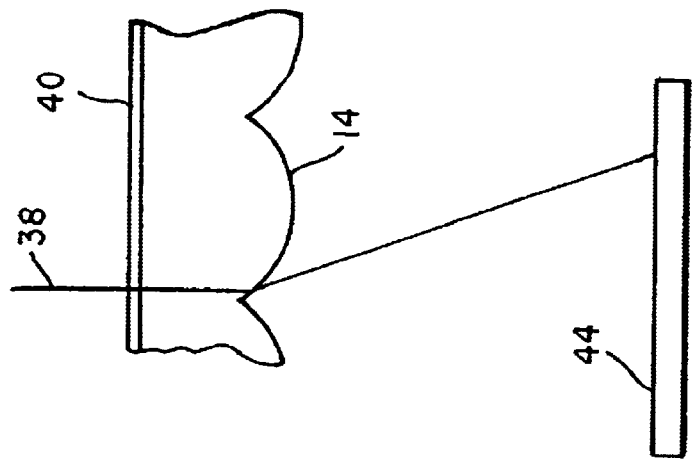
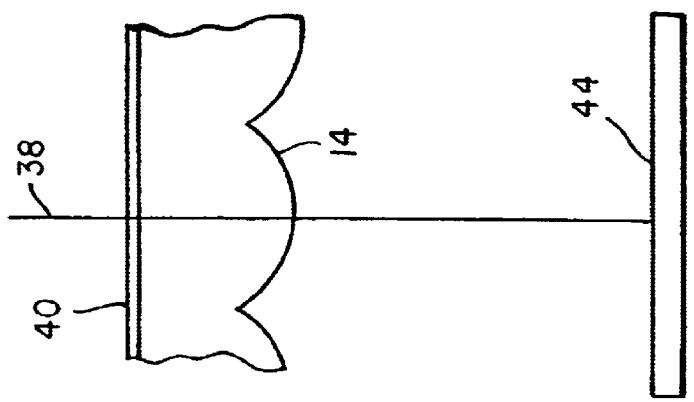
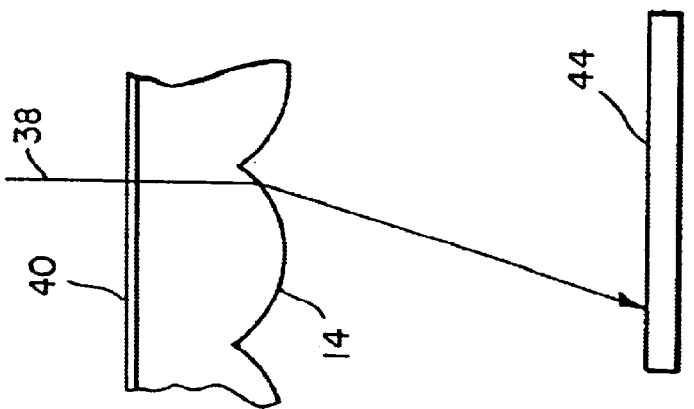

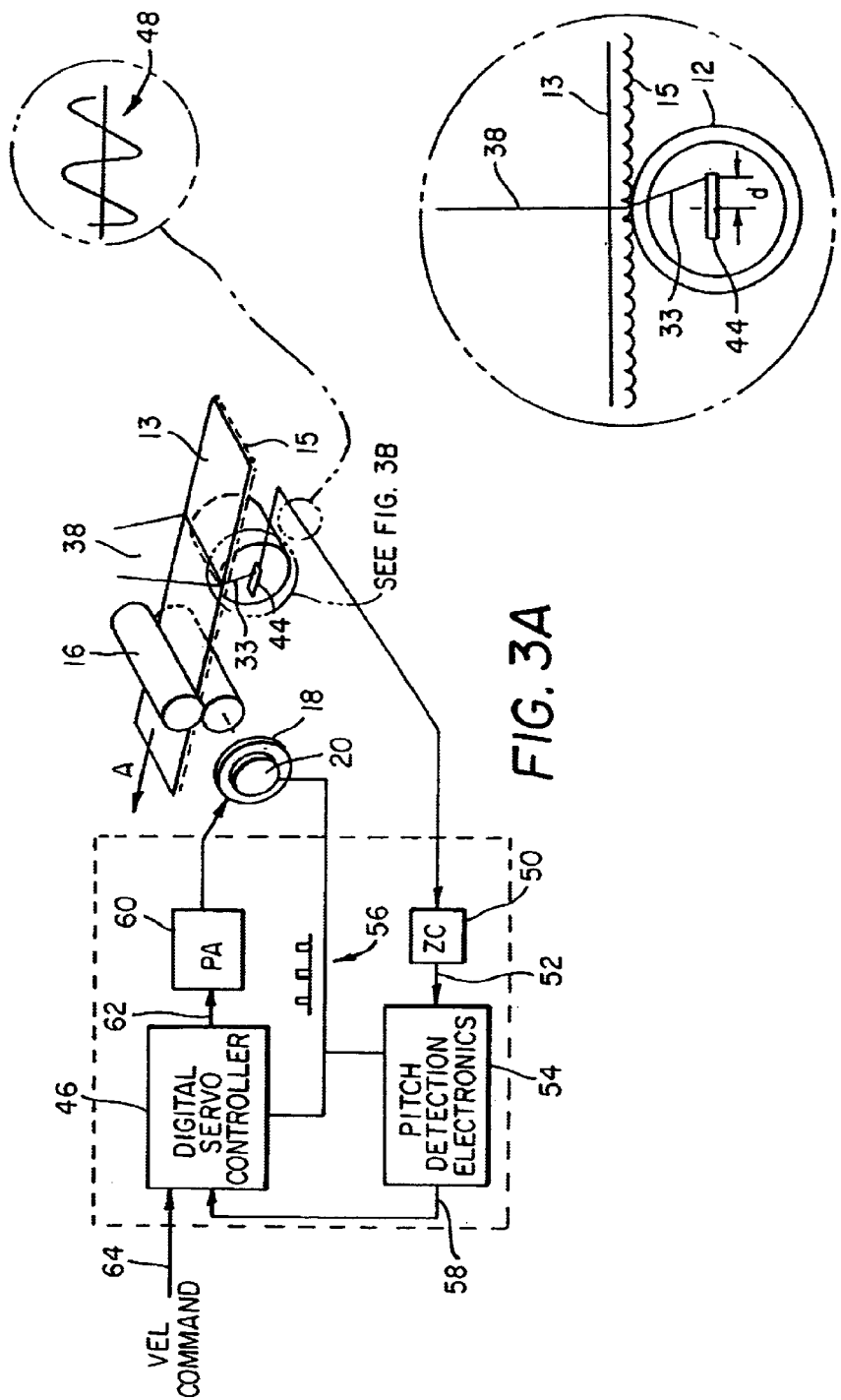

DETECTION OF PITCH VARIATIONS IN LENTICULAR MATERIAL

CROSS REFERENCE TO RELATED APPLICATIONS

This application is a Continuation application of U.S. patent application Ser. No. 09/033,212, filed Mar. 2, 1998 now abandoned, which is a Continuation-in-Part application of U.S. patent application Ser. No. 08/828,637 filed Mar. 31, 1997, now U.S. Pat. No. 5,835,194, issued Nov. 10, 1998.

FIELD OF THE INVENTION

This invention relates in general to the field of manufacturing lenticular images and more particularly to detecting and measuring the pitch of lenticular material which is used for producing the lenticular images. More specifically, the invention relates to the detection of a change in pitch of the lenticular lenses as the material is transported in a scanning laser printer.

BACKGROUND OF THE INVENTION

Lenticular images include an array of cylindrical lenses in a lenticular material and a sequence of spatially multiplexed images that are viewed throughout the lenticular material so that different ones of the multiplexed images are viewed at different angles by the viewer. One image effect produced by the lenticular image is a depth or 3D image where one eye views one image of a stereo pair or sequence from one angle and the other eye views another image from the stereo pair. Another image effect is a motion image where different images in a motion image sequence are viewed by changing the angle at which the image is viewed. Other effects that combine these two effects, or form collages of unrelated images that can be viewed from different viewing angles can be provided.

It has been proposed to create lenticular images by providing a lenticular material having a color photographic emulsion thereon. The spatially multiplexed images are exposed onto the lenticular media by a laser scanner and the material is processed to produce the lenticular image product. See for example, U.S. Pat. No. 5,697,006, issued Dec. 9, 1997 to Taguchi et al.

The image that is exposed on the lenticular media must be very precisely positioned under each lenticule. Unfortunately, the manufacturing and keeping tolerances of lenticular media result in significant changes in the pitch of the lenticular lenses in the media. If the pitch of the lenticular lenses on the material varies or is different from what is expected, the image quality will be comprised. There is a need therefore for an improved manufacturing process for making lenticular image products form lenticular media of the type having a lenticular lens array coated with photographic emulsion.

It is known to scan a non actinic laser beam across a lenticular array in a direction perpendicular to the axes of the lenticular lenses, and to sense the deflection of the beam by the lenticular lenses to produce an output clock for modulating a writing beam. See U.S. Pat. No. 5,681,676, issued Oct. 28, 1997 to Telfer et al.

It is one object of this invention to provide a method and apparatus for detecting and/or measuring any variation of lenticular pitch for the purpose of printing accurate images on the media. It is another object of the invention to provide a method and apparatus for compensating for such variations during manufacture of a lenticular image product.

SUMMARY OF THE INVENTION

The present invention is directed to overcoming one or more of the problems set forth above. Briefly summarized, according to one aspect of the present invention, a lenticular image product is formed from a lenticular material having an array of cylindrical lenses and a photographic emulsion coated thereon, by scanning the lenticular material with an intensity modulated first beam of light in a direction parallel to the long axes of the cylindrical lenses to form a latent lenticular image in the photographic emulsion. A second beam of light having a wavelength outside of the range of sensitivity of the photographic emulsion is focused into a spot smaller than the pitch of the cylindrical lenses onto the lenticular material. The lenticular material is moved through the beam in a direction perpendicular to the axes of the cylindrical lenses to provide a page scan motion of the lenticular material and to modulate the angle of reflection or refraction of the second beam of light. The position of the angularly modulated second beam of light is sensed and the sensed position is used to control the motion of the lenticular material.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The invention provides an accurate method for either mapping lenticular pitch or detecting pitch variations which can be compensated in a laser printer, thereby enabling efficient production of lenticular image products using lenticular media having photographic emulsion coated thereon.

BRIEF DESCRIPTION OF THE DRAWINGS

FIGS. 2A, 2B, and 2C are schematic diagram illustrating the effect of the lenticular medium on the second beam of light;

FIG. 3A is a schematic block diagram illustrating the control of media transport according to the present invention.

FIG. 3B is a diagrammatic view useful in exploring the present invention.

To facilitate understanding, identical reference numerals have been used where possible, to designate identical elements that are common to the figures.

DETAILED DESCRIPTION OF THE INVENTION

Figure 1:
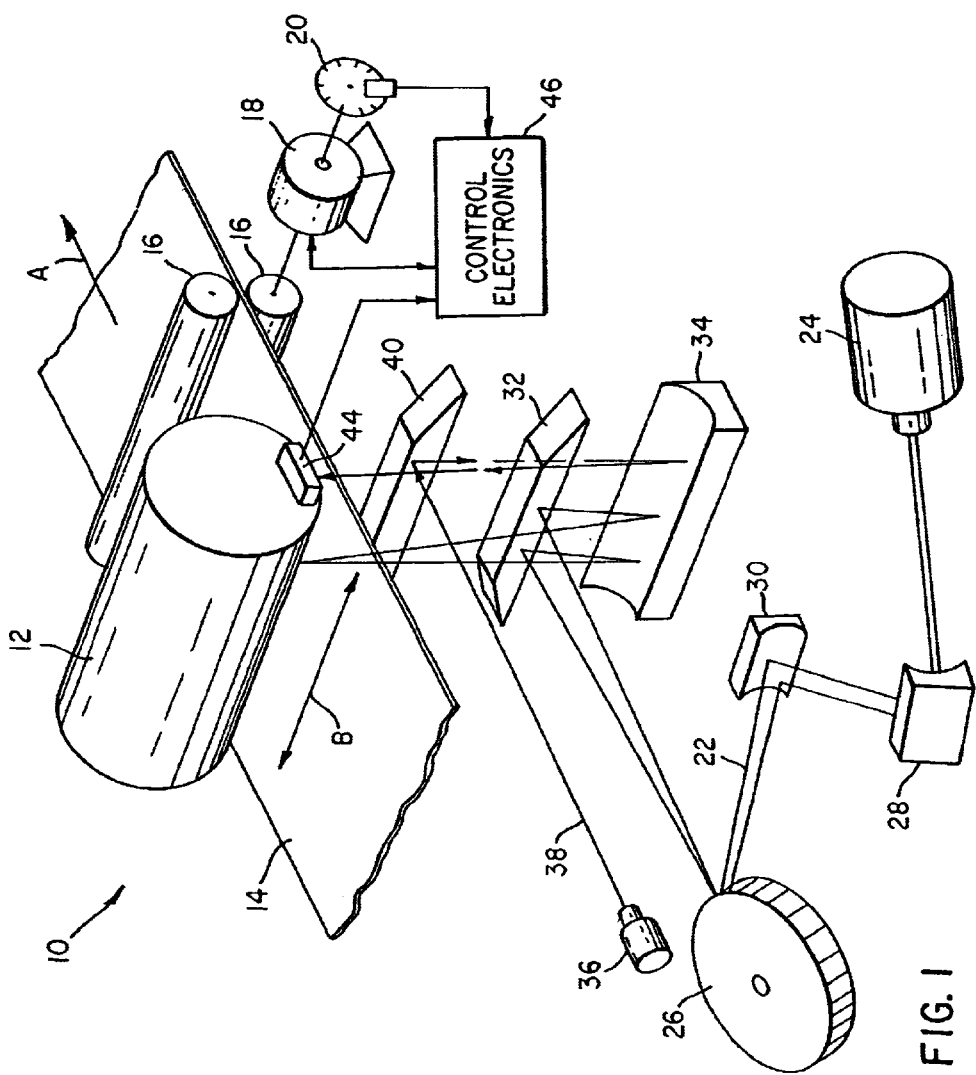
FIG. 1 is a schematic diagram of an apparatus employed to produce lenticular image products according to the present invention.

Referring to FIG. 1, lenticular image product production apparatus 10 includes a platen 12 for supporting lenticular media 14. Lenticular media 14 is transported past platen 12 in the direction of arrow A by a pitch roller drive system 16 that is driven by motor 18. An encoder 20 is provided on the shaft of motor 18 to provide a measurement of the distance that the lenticular media 14 is transported. The lenticular media 14 is exposed with a laser beam 22 from a modulated laser 24. The laser beam 22 is focused onto a scanning polygon 26 by a pair of beam shaping mirrors 28 and 30. The laser beam 22 is reflected from a cold mirror (reflects visible light and transmits infrared light) 32 onto a cylindrical mirror 34, which refocuses the laser beam 22 onto the media 14. The scanning polygon 26 causes the laser beam 22 to scan the lenticular media in the direction of arrow B, parallel to the long cylindrical axes of the lenticular lenses in the media. The motion of the media past platen 12 provides scanning in the orthogonal direction.

An infrared laser 36, located at distance from the surface of the media identical to the distance to the scanning face of the polygon 26, forms a second beam of light 38, of a wavelength that does not expose the lenticular media 14. The second beam of light is reflected by a mirror 40 through cold mirror 32 onto cylindrical mirror 34. Cylindrical mirror 34 focuses the second beam 38 onto the surface of the lenticular material 14. In response to motion of lenticular media 14, a sensor 44 detects the angular displacement caused by the lenticular lenses in the lenticular material 14 of the second beam 38 to provide a pitch indication signal to control electronics 46.

Control electronics 46 employs the pitch correction signal and the signal from encoder 20 as described below to control the motor 18 so that the media 14 travels past platen 12 at a constant pitch rate.

FIGS. 2A, 2B, and 2C illustrate how the lenticular material deflects the beam 38 of infrared light as it passes through different portions of one of the lenticular lenses in the lenticular material. As the beam 38 first encounters a lenticule, as shown in FIGS. 2A, it is refracted at a large angle to the left and impinges on the left side of the position sensing detector 44. The angle depends upon the position of the lenticule with respect to the beam 38. When the beam is at the center of a lenticule FIG. 2B, it is minimally deflected as shown in the illustration in the center and falls on the center of the position sensor 44. As the lenticular material is moved further to the right, as shown in FIG. 2C, the beam is deflected to the right and impinges on the right side of the position sensor 44. The position sensor 44 may be, for example, a PSD S3932 position sensitive detector available from Hamamatsu Photonics KK, Hamamatsu, Japan.

Figure 4:
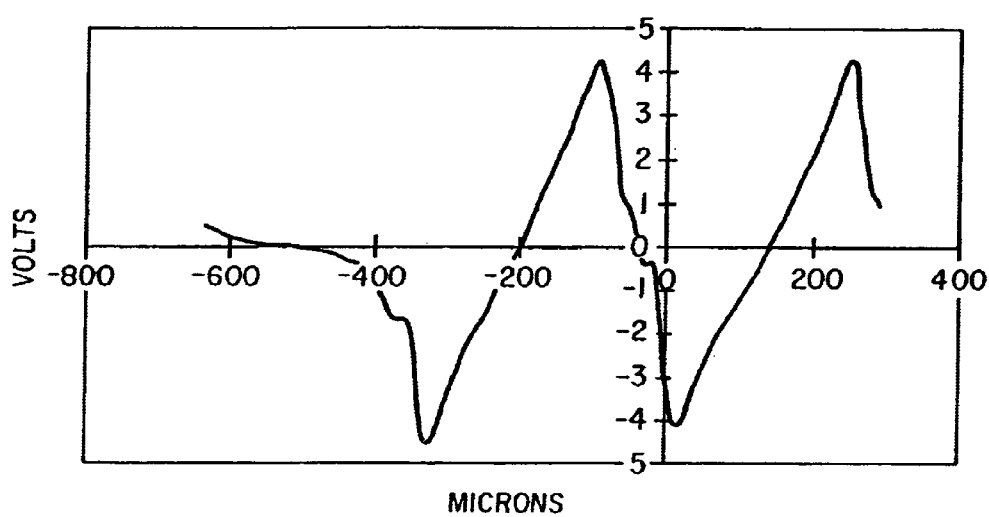
FIG. 4 is a plot showing the output of the sensor shown in FIG. 3.

Referring now to FIG. 3A, the control electronics is shown in further detail. A beam of light 38 is focused onto a flat surface 13 of the lenticular material 14. The lenticular material 14 is moved relative to the beam 38 by a transport mechanism 16 which contains an encoder 20. When the beam 38 passes through the curved surface 15 of the lenticular material 44 it refracts at a large angle. The centroid of the exiting beam 33 is axially displaced from the original beam 38 by a distance d (see FIG. 3B). This distance d is measured by a position sensing detector 44. As the transport mechanism 16 moves the lenticular material 14, the distance d changes. This creates an output signal 48 which is then supplied to a zero crossing comparator 50. As soon as a zero crossing is detected by the comparator, a zero crossing signal 52 is sent to the pitch detection electronics 54, triggering the counting of encoder pulses 56. The output of pitch detection electronics 54 is a signal proportional to encoder pulse counts per lenticule which defines the lenticular pitch error 58. The pitch error 58 is supplied to the digital servo control 46 as a velocity correction signal to the nominal velocity command 64. The output of digital servo controller 46, control signal 62, is sent to power amplifier 60 to drive media transport motor 18. FIG. 4 shows waveform 48 produced by position detector 44.

Figure 5:
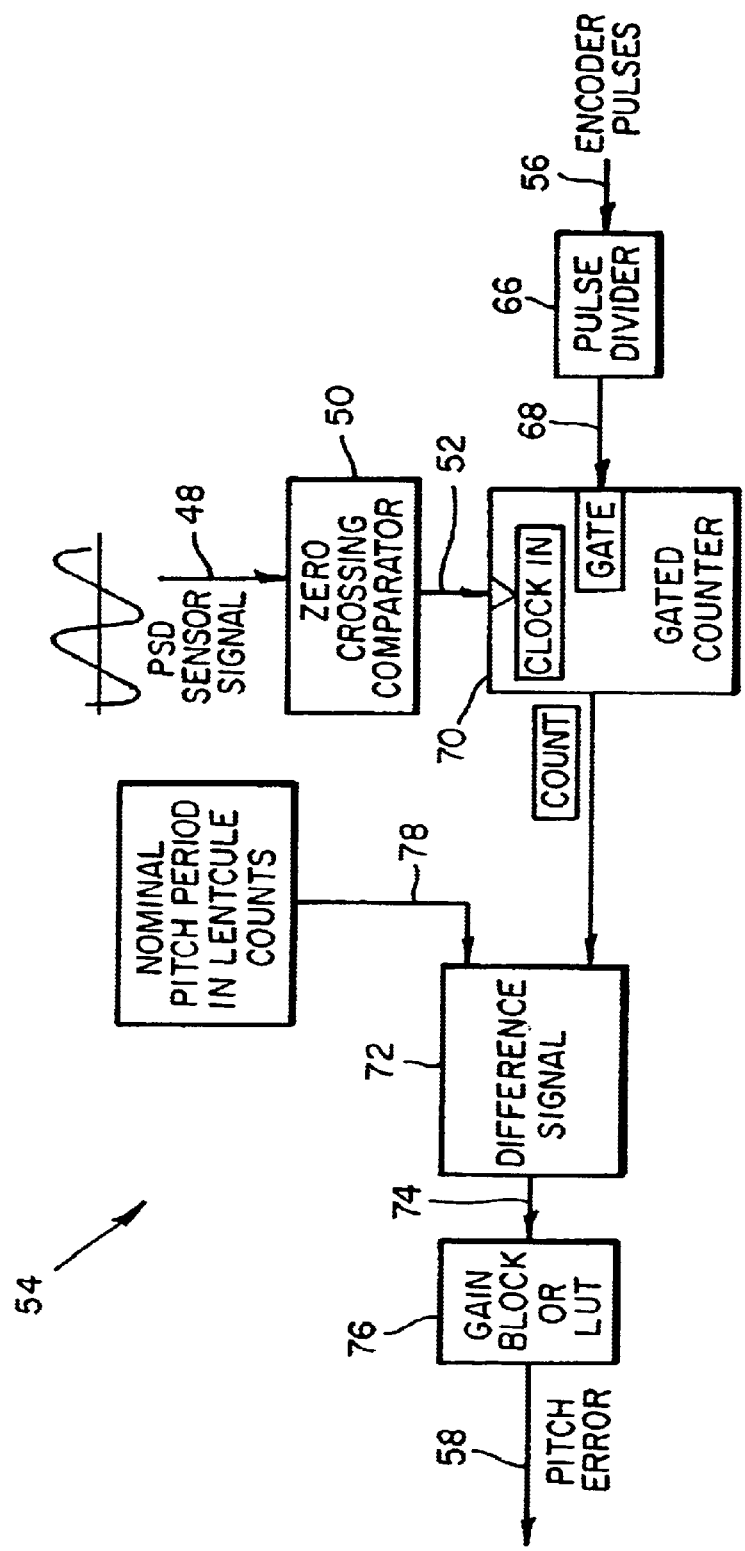
FIG. 5 is a schematic diagram illustrating apparatus for generating a correction signal for controlling the motion of the lenticular medium according to a preferred embodiment of the invention.

Turning now to FIG. 5, a preferred arrangement for pitch detection electronics 54 will be described. The effective error in the lenticular pitch is computed by counting the cycles of the output signal 48 from the position sensing detector 44 (see FIG. 3A) which occur over a predetermined distance as measured by counting a pre-determined number of encoder pulses 56. The measurement occurs after the media transport 16 has reached its nominal transport speed. At this point, a counter 66, DIV has been preset to a predetermined value and is enabled to count down one count per encoder pulse. During the period defined by the pre-determined value, a GATE pulse signal 68 is produced which enables the gated counter 70. The output signal 48 is applied to a zero crossing comparator 50 which produces a square wave CLK IN 52. The gated counter 70 counts one count per each rising edge of the signal 52 at CLK IN thus accumulating the number of full cycles of the output signal 48. The gated counter 70 could likewise be configured to count on the falling edge of the CLK IN signal 52. The ideal choice of edge is that which corresponds to the zero crossing associated with the beam 38 at the center of the lenticular lens 14 illustrated in of FIG. 2B. At the next GATE pulse 68, the output of the gated counter 70 is latched and output to a difference circuit 72 which computes the pitch difference. The pitch difference 74 is the difference between the measured lenticule count and the nominal lenticule count 78. This pitch difference is then applied to the Gain or LUT block 76, which adjusts this pitch difference signal to a scaled value which is then sent as a pitch error signal 58 to the digital servo controller 46 to correct the transport speed of the media 14. The desired result of this correction to the transport speed is to move the lenticular media at a constant lenticular pitch rate, thereby compensating for lenticular media pitch imperfections. Subsequently, the gated customer 70 is zeroed when the next gate pulse 68 from the divider circuit 66 and begins counting on the next appropriate edge of the zero crossing comparator output 52.

Figure 6:
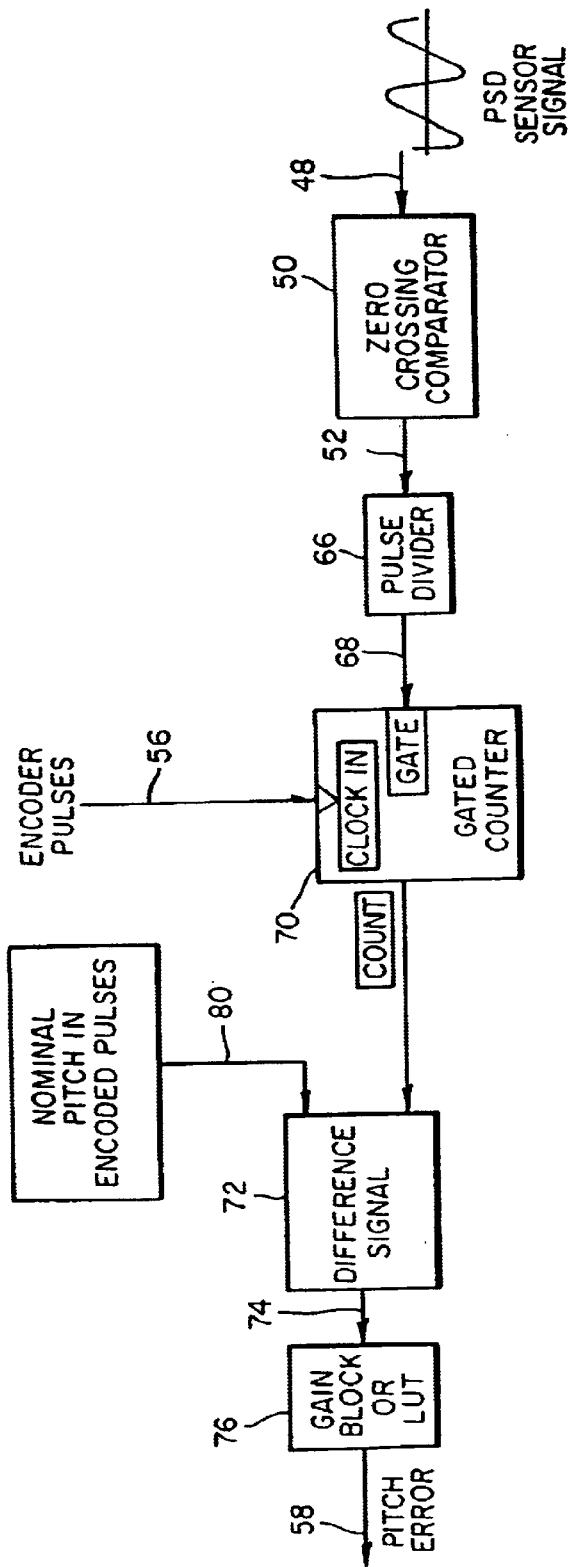
FIG. 6 is a schematic diagram illustrating apparatus for generating a correction signal for controlling the motion of the lenticular medium according to an alternate embodiment of the invention.

Turning now to FIG. 6, an alternate arrangement for pitch detection electronics 54 will be described. The effective error in the lenticular pitch is computed by dividing the number of predetermined cycles of the output 48 of position detector 44 by the distance within the media as measured by counting the number of encoder pulses 56 generated. The measurement occurs after the media transport 16 has reached its nominal transport speed. The output signal 48 is fed to a zero crossing comparator 50 to produce a square wave 52. The square wave 52 us fed to the counter 66 DIV, which has been preset to a predetermined value and is enabled to count down one count per rising edge of the square wave 52. As explained above, the counter could likewise be configured to count on the falling edge of the square wave 52. Gate pulse signal 68 initiates counting by the gated counter 70. In this embodiment, the encoder pulses 56 are directed to the input referred to as CLKN IN. The gated counter 70 counts one count per each rising edge of the signal at CLKN IN thus accumulating the number of encoder pulses 56 within the pre-determined number of cycles of output 48. At the occurrence of the next GATE pulse, the output of the gated counter 70 is latched to the difference circuit 72 which computes the pitch difference 74. The pitch difference 74 is the difference between the measured encoder count and the nominal pitch in encoder pulses 80. This pitch difference is then applied to the Gain or LUT block 76, which adjusts this pitch difference signal to a scaled value which is then sent as a pitch error signal 58 to the digital servo controller 46 to correct the transport speed of the media 14. The desired result of this correction to the transport speed is to move the lenticular media at a constant lenticular pitch rate, thereby compensating for lenticular media pitch imperfections. Subsequently, the gated counter 70 is zeroed and beings counting after the next appropriate edge of the zero crossing comparator output 52.

Figure 7:
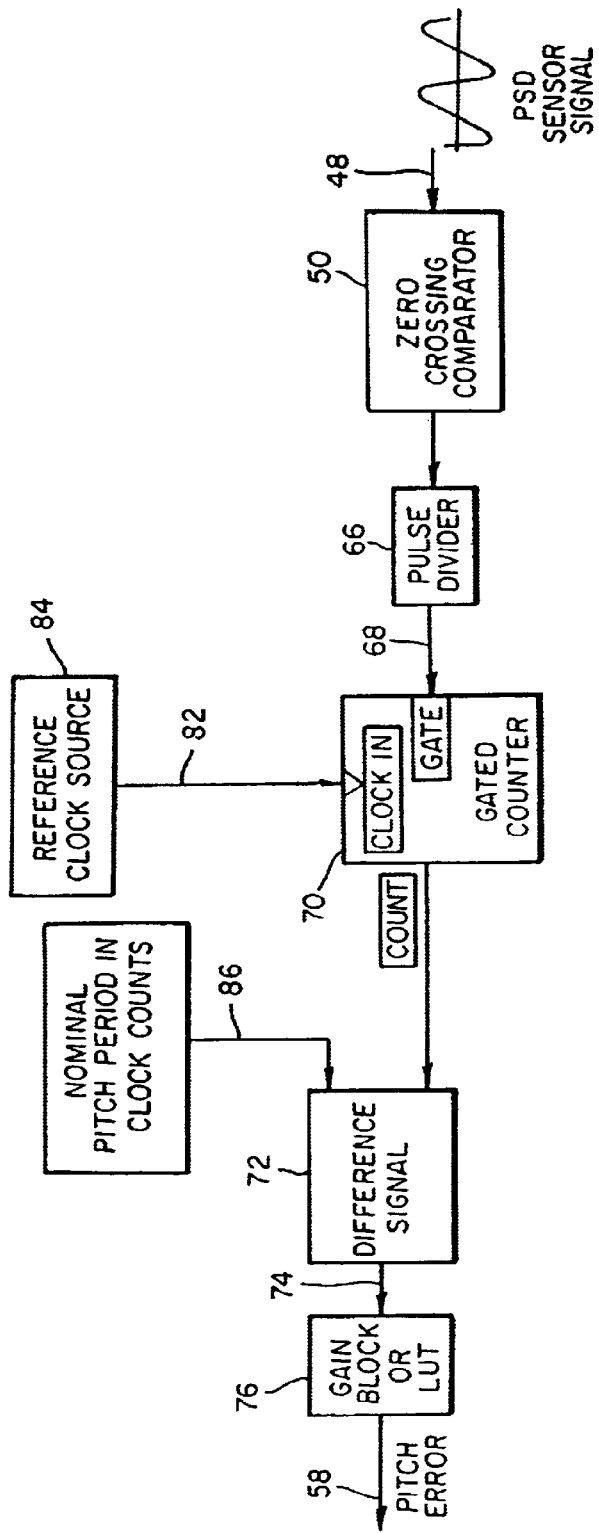
FIG. 7 is a schematic diagram illustrating apparatus for generating a correction signal for controlling the motion of the lenticular medium according to a further alternative embodiment of the invention.

Turning now to FIG. 7, alternate arrangement for pitch detection electronics 54 will be described. The signal 48 from the position sensor 44 produced by the second beam of light 38, as its angle is modulated by the lens of the lenticular media 14, is applied to a Zero Crossing Comparator 50 which produces a square wave logic signal 52. The rising and falling edges of this square wave signal correspond to the transitions through zero of the position sensor waveform 48. The ideal choice of edge is that which corresponds to the zero crossing associated with the beam 38 at the center of the lenticular lens 14 illustrated in the center view (B) of FIG. 2. This square wave logic signal 52 is then applied to a divider circuit 66 which counts a predetermined number of lenticule appropriate zero crossings of waveform 48. At the occurrence of this pre-determined number of zero crossings the divider circuit 66 outputs a gating pulse signal 68 to the gated counter circuit 70.

The function of the gated counter circuit 70 is to count the clock pulses 82 applied to its clock input from the reference clock source 84, during the time that occurs between the gate input pulses 68 from the divider circuit 66. At the end of a counting cycle, which is terminated by a new gate pulse 68 from the divider circuit 66, the current count is latched and output to the next block which is the difference circuit 72. At the same time the count is latched, the gate counter 70 is zeroed and begins again counting the reference clock pulses 82 applied to its clock input. The latched count output is applied to the difference circuit 72 which subtracts the count from the expected nominal pitch period in clock counts 86. The output 74 of the difference circuit 72 is the pitch difference of the latest measured count or pitch period with respect to the expected nominal pitch period 86. This pitch difference 74 is then applied to the gain or LUT block 76 which adjusts this pitch difference signal 74 to a scaled value 58. The scaled value 58 is the pitch error, which is then sent to the digital servo controller 46 to correct the transport speed of the media 14. The desired result of this correction to the transport speed is to move the lenticular media 14 at a constant lenticular pitch rate thereby compensating for lenticular media pitch imperfections.

Figure 8:
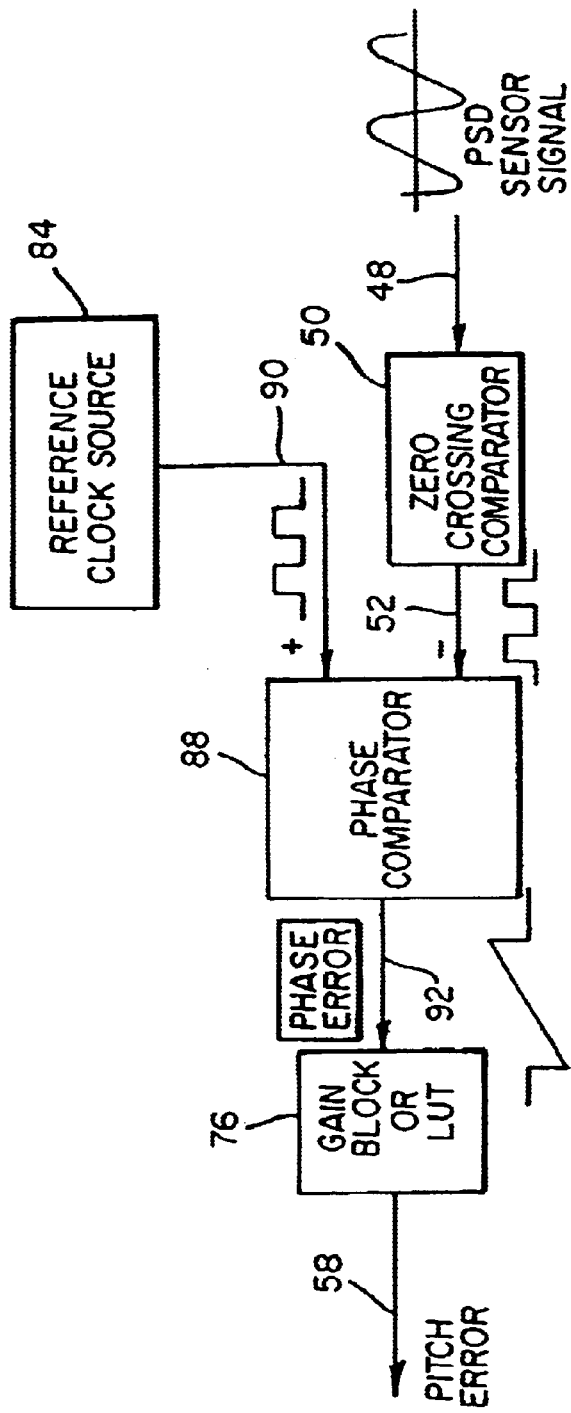
FIG. 8 is a schematic diagram illustrating apparatus for generating a correction signal for controlling the motion of the lenticular medium according to a still further embodiment of the invention.

Turning now to FIG. 8, a still further alternate arrangement for pitch detection electronics 54 will be described. The signal 48 from the position detector 44 produced by the second beam of light 38, as its angle is modulated by a lenticule of the lenticular media 14, is applied to a zero crossing comparator 50 which produces a square wave logic signal 52. The rising and falling edges of this square wave signal 52 correspond to the transitions through the zero of the position detector signal 48. This square wave signal 52 is applied to a minus input of a phase comparator circuit 88. The purpose of the phase comparator circuit 88 is to determine the phase error occurring between the output of the zero crossing comparator 50 and a reference phase clock 90.

The reference phase clock 90 is generated from a clock reference 84 and is the desired frequency of the signal 48 produced by the lenticular media 14 as its moved by the transport 16. The reference phase clock 90 is applied to the plus input of the phase comparator 88. The phase comparator 88 which is commonly known and understood in the art, produces an output signal 92 representing the phase difference of the two input signals over a range of plus or minus 180 degrees of phase shift between the two input waveforms. This output phase error signal 92 is applied to the gain or LTJT block 76 which adjusts the signal to a scaled value. The scaled value 58 represents the pitch error, which is then sent to the digital servo controller 46 to correct the transport speed of the media 14. The desired result of this correction to the transport speed is to move the lenticular media 14 at a constant lenticular pitch rate, thereby compensating for lenticular media pitch imperfections.

The invention has been described with reference to a preferred embodiment, however, it will be appreciated that variations and modifications can be effected by a person of ordinary skill in the art without departing from the scope of the invention.

| PARTS LIST | |
|---|---|
| 10 | Image product production apparatus |
| 12 | Media platen |
| 14 | Lenticular media |
| 16 | Pinch roller drive system |
| 18 | Drive motor |
| 20 | Encoder |
| 22 | Writing laser beam |
| 24 | Modulated laser |
| 26 | Scanning polygon |
| 28 | Beam shaping mirror |
| 30 | Beam shaping mirror |
| 32 | Cold mirror |
| 34 | Cylindrical mirror |
| 36 | Infrared laser |
| 38 | Infrared laser bean |
| 40 | Mirror |
| 44 | Position sensing detector |
| 46 | Control electronics |
| 48 | Position sensing detector output signal |
| 50 | Zero crossing comparator |
| 52 | Signal output from zero crossing comparator |
| 54 | Pitch detection electronics |
| 56 | Encoder pulses |
| 58 | Lenticular pitch error |
| 60 | Power amplifier |
| 62 | Control signal |
| 64 | Nominal velocity command signal |
| 66 | Pulse divider |
| 68 | Gate pulse signal |
| 70 | Gated counter |
| 72 | Difference circuit |
| 74 | Pitch difference signal |
| 76 | Gain or LUT block |
| 78 | Nominal puck period in lenticule counts |
| 80 | Nominal pitch in encoder pulses |
| 82 | Reference clock pulses |
| 84 | Reference clock source |
| 86 | Nominal pitch period in clock counts |
| 88 | Phase comparator |
| 90 | Reference phase clock |
| 92 | Phase error |

What is claimed is:

1. Apparatus for forming a lenticular image product from a sheet of lenticular material having one side forming an array of cylindrical lenses having a pitch between lenses and a flat opposite side and a photographic emulsion coated on the flat side, said emulsion having a range of wavelength sensitivity comprising:

means for scanning the flat side of the lenticular material with an intensity modulated first beam of light in a direction parallel to the long axes of the cylindrical lenses to form a latent lenticular image in the photographic emulsion;

means for focusing a second beam of light having a wavelength outside of the range of sensitivity of the photographic emulsion into a spot smaller than the pitch of the cylindrical lenses onto the lenticular material;

means for moving the lenticular material in a direction perpendicular to the axes of the cylindrical lenses to provide a page scan motion of the lenticular material and to modulate the angle of reflection or refraction of the second beam of light; and a position sensor for sensing the position but not the intensity of the angularly modulated second beam of light to control the motion of the lenticular material; and further comprising:
   means for moving the lenticular material by a known distance relative to the second beam of light;
   means for sensing the number of cycles that the angularly modulated second beam of light swings from one extreme to the other during the motion;
   means for computing the pitch by dividing the number of beam swings by the known distance; and
   means for controlling the motion of the lenticular material as a function of the pitch.

2. The apparatus of claim 1 further comprising:
   means for controlling the motion of the lenticular material such that a predetermined number of lenticular lenses pass through the second beam of light in a unit of time.

3. The apparatus of claim 1, wherein the position of the angularly modulated second beam of light is sensed by a photosensor.

4. The apparatus of claim 1, wherein the second beam of light is incident upon the flat side of the lenticular material and wherein the means for sensing the second beam of light is located on the side having lenticular lenses.

5. Apparatus for forming a lenticular image product from a sheet of lenticular material having one side forming an array of cylindrical lenses having a pitch between lenses and a flat opposite side and a photoeraphic emulsion coated on the flat side, said emulsion having a range of wavelength sensitivity comprising:

means for scanning the flat side of the lenticular material with an intensity modulated first beam of light in a direction parallel to the long axes of the cylindrical lenses to form a latent lenticular image in the photographic emulsion;

means for focusing a second beam of light having a wavelength outside of the range of sensitivity of the photographic emulsion into a spot smaller than the pitch of the cylindrical lenses onto the lenticular material;

means for moving the lenticular material in a direction perpendicular to the axes of the cylindrical lenses to provide a page scan motion of the lenticular material and to modulate the angle of reflection or refraction of the second beam of light; and a position sensor for sensing the position but not the intensity of the angularly modulated second beam of light to control the motion of the lenticular material; and further comprising:
   means for moving the lenticular material until the angularly modulated second beam of light swings through a predetermined number of cycles;
   means for measuring the distance that the material moves during the predetermined number of cycles;
   means for computing the pitch by dividing the predetermined number of beam swings by the measured distance; and
   means for controlling the motion of the lenticular material as a function of the pitch.

6. Apparatus for forming a lenticular image product from a sheet of lenticular material having one side forming an array of cylindrical lenses having a pitch between lenses and a flat opoosite side and a photographic emulsion coated on the flat side, said emulsion having a range of wavelength sensitivity comprising:

means for scanning the flat side of the lenticular material with an intensity modulated first beam of light in a direction parallel to the long axes of the cylindrical lenses to form a latent lenticular image in the photographic emulsion;

means for focusing a second beam of light having a waveleneth outside of the range of sensitivity of the photographic emulsion into a spot smaller than the pitch of the cylindrical lenses onto the lenticular material;

means for moving the lenticular material in a direction perpendicular to the axes of the cylindrical lenses to provide a page scan motion of the lenticular material and to modulate the angle of reflection or refraction of the second beam of light; and a position sensor for sensing the position but not the intensity of the angularly modulated second beam of light to control the motion of the lenticular material; and further comprising:
   means for moving the lenticular material at a constant velocity until the angularly modulated second beam of light swings through a predetermined number of cycles;
   means for measuring the time that the material moves during the predetermined number of cycles;
   means for computing the pitch by multiplying the predetermined number of beam swings by the measured time and dividing the product by the known velocity; and
   means for controlling the motion of the lenticular material as a function of the pitch.

* * * * *